Nov. 10, 1970  S. RUBEN  3,539,398
MAGNESIUM PRIMARY CELL
Filed June 23, 1969
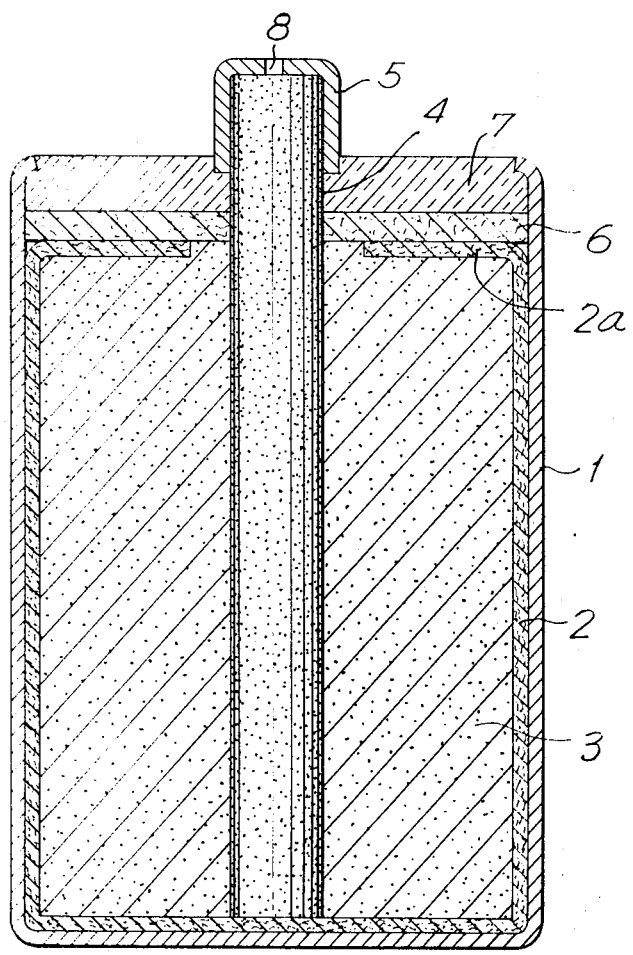
INVENTOR.
SAMUEL RUBEN
BY
ATTORNEY United States Patent Office
3,539,398
Patented Nov. 10, 1970

3,539,398
MAGNESIUM PRIMARY CELL
Samuel Ruben, 52 Seacord Road,
New Rochelle, N.Y. 10801
Filed June 23, 1969, Ser. No. 835,540
Int. Cl. H01m 17/02
U.S. Cl. 136—100          13 Claims

ABSTRACT OF THE DISCLOSURE

The invention is a primary electric current producing cell utilizing magnesium as the anode and a water soluble oxygen yielding permanganate, such as potassium permanganate, as cathode depolarizer and a halogen electrolyte containing the permanganate in solution.

The invention relates to magnesium primary cells.

The general object of the invention is the provision of a dry cell to replace conventional zinc-carbon-sal ammoniac cells which does not require the use of zinc and which will be competitive in cost with commercial Le Clanche type cells.

Another general object is to produce a cell having a higher potential than conventional zinc carbon cells, having a long shelf life with minimum local action and minimum production of hydrogen gas on discharge.

Other objects will be apparent from the disclosure and from the drawing which is a view partially in section illustrating a cell structure embodying the invention.

The cell of the invention utilizes an anode of magnesium, a depolarizing cathode composed substantially of a water soluble oxygen yielding permanaganate such as potassium permanganate mixed with an electronic conductor, such as finely divided carbon, for example, Shawinigan black or micronized graphite, and an aqueous halogen metal salt which is stable with magnesium and in which the permanaganate is soluble. The alkaline earth halides are preferred, specifically an alkaline earth chloride, such as magnesium chloride ($MgCl_2 \cdot 6H_2O$) containing permanganate in solution. The anode and cathode are desirably separated by an oxidation resistant submicroporous spacer, such as "Acropor," a nylon cloth impregnated with a co-polymer of vinyl chloride and acrylonitrile, "Synpor," a microporous polyvinyl chloride, or "Permion," a microporous polyethylene.

The depolarizer may be made by grinding potassium permanganate to a powder then mixing it with Shawinigan black in the ratio of 7 parts of $KMnO_4$ and 3 parts by weight of Shawinigan black. To each 10 grams of this mixture is added 10 ml. of a 50 g. per 100 ml. $H_2O$ of $MgCl_2 6H_2O$ saturated with $KMnO_4$. The electrolyte is no longer only a halogen solution, but specifically a combination of a solution of potassium permanganate and magnesium chloride. Potassium permanganate dissolves in the aqueous magnesium chloride solution raising the specific gravity from 1.14 to 1.16. It is desirable to initially saturate the electrolyte with the permanganate so as to avoid dissolution of the permanganate from the depolarizer bobbin. The proportion of micronized graphite or other finely divided conductor added to the permanganate may generally vary between 10% and 30% of the mix.

In magnesium cells of the prior art utilizing a halogen electrolyte, the depolarizer, such as manganese dioxide, is substantially insoluble in the electrolyte. In the cell of this invention, the water soluble permanganate is not readily soluble in the permanganate saturated electrolyte, and this gives the electrolyte a double function: as an ionic conductor and, in part, as a depolarizer at the cathode surface. If the electrolyte is not initially saturated with $KMnO_4$, saturation will occur over a period of time, due to dissolution of the $KMnO_4$ in the electrolyte.

The drawing shows a typical dry cell arrangement. The container 1 comprises a magnesium container which serves as the anode and negative terminal. The container 1 is lined with a layer of "Acropor" film 2 of a thickness of approximately .004". A solid depolarizer bobbin 3 composed of a mixture of $KMnO_4$, Shawinigan carbon and $KMnO_4$ saturated solution of $MgCl_2 \cdot 6H_2O$ is in intimate contact with the liner 2 which is folded over at 2a against the top of the bobbin. A carbon rod 4 having contacting cap 5 serving gas the positive terminal is inserted into the bobbin through waxed fibre washer 6 and is forced over the bobbin which is consolidated against the lined inner walls of the magnesium container 1. The space above washer 6 is filled with a wax sealing compound 7. Prior to the pouring of the wax, the top edges of the container 1 are rolled inward to obtain maximum retention of the wax when it hardens. A vent hole in contacting cap 5 is provided at 8. The open circuit potential of the cell is 2.43 volts.

While potassium permanganate is the lowest cost permanganate for a practical cell, I have constructed other cells with the permanganates of calcium, barium, strontium, sodium and lithium. While all of these permanganates function, the potassium permanganate is commercially preferable.

The electrolyte may be one of the alkaline earth halides, such as the chloride, bromide or iodide of magnesium, calcium, strontium or barium, with $MgCl_2$, however, being preferred. Gas generation or $MgCl_2/KMnO_4$ is negligible, the dissolved permanganate apparently acting as an inhibitor. The cell of the invention possesses a good shelf life.

By saturating the electrolyte with the maximum quantity of permanganate dissolvable in it, no further dissolution of the cathode can occur and therefore a solid structure with good electrical contact is maintained on shelf and during use.

While the drawing illustrates a conventional cylindrical type cell, other structures, such as flat plate, stacked or button type structures common to the art may be employed. By the addition of 2% of "Cab-O-Sil," a submicron size "fumed" silica, a soft gelled type of bond for the graphite permanganate mix is obtained. "Cab-O-Sil" may also be employed to immobilize the electrolyte to a gel form.

As used herein the term magnesium is meant to include magnesium as well as alloys consisiting preponderantly of magnesium but containing small amounts of other elements which do not deleteriously react within the cell.

I claim:

1. A primary cell comprising a magnesium anode and a cathode depolarizer composed substantially of an oxygen yielding permanganate dissolved in an alkaline earth halide electrolyte.

2. The primary cell described in claim 1 characterized in that the electrolyte is magnesium chloride.

3. The primary cell described in claim 1 characterized in that the permanganate is selected from the group consisting of the permanganates of potassium, calcium, barium, strontium, sodium and lithium.

4. A primary cell comprising a magnesium anode, a cathode depolarizer composed substantially of a mixture of a water soluble oxygen yielding permanganate and a finely divided conductor, and an alkaline earth halide electrolyte.

5. The cell described in claim 4 characterized in that the finely divided conductor is carbon.

6. A primary cell comprising a magnesium anode, a cathode depolarizer composed substantially of a permanganate of one of the metals potassium, calcium, barium, strontium, sodium and lithium, a microporous electrolyte permeable oxidation resistant spacer interposed between the anode and the cathode depolarizer and an alkaline earth halide electrolyte having one of said permanganates dissolved therein.

7. A primary cell comprising a magnesium anode, a cathode depolarizer composed substantially of a mixture of potassium permanganate and a lesser amount of Shawinigan black, and an electrolyte of magnesium chloride containing potassium permanganate in solution.

8. A primary cell comprising a magnesium anode and a depolarizer which is a solid composite of potassium permanganate and carbon plus an alkaline earth halide electrolyte containing permanganate in solution.

9. A primary cell comprising a magnesium anode and a depolarizer-electrolyte comprising a saturated solution of a water soluble oxygen yielding permanganate in an aqueous alkaline earth halide electrolyte.

10. The primary cell described in claim 9 characterized in that the permanganate is potassium permanganate and the alkaline earth halide electrolyte is magnesium chloride.

11. A primary cell comprising a solid mixture of a permanganate cathode and an alkaline earth halide electrolyte having a saturated permanganate content, an anode of magnesium, and a separator between said mixture and said anode, comprising a microporous oxidation resistant electrolyte permeable spacer.

12. The cell described in claim 11 characterized in that the permanganate is selected from the group consisting of the permanganates of potassium, calcium, barium, strontium, sodium and lithium.

13. A primary cell comprising a magnesium anode container, a composite cathode-electrolyte comprising a solid mixture of an oxygen yielding permanganate, finely divided carbon and an alkaline earth halide electrolyte, said electrolyte being saturated with said permanganate, and microporous oxidation resistant spacer interposed between said anode container and said solid mixture.

References Cited

UNITED STATES PATENTS

| 2,422,045 | 6/1947 | Ruben. | |
| 2,897,249 | 7/1959 | Glicksman et al. | 136—102 |
| 2,952,727 | 9/1960 | Kirk et al. | 136—120 |

WINSTON A. DOUGLAS, Primary Examiner

C. F. LEFEVOUR, Assistant Examiner

U.S. Cl. X.R.

136—138, 155